United States Patent [19]

Kaupert

[11] 4,426,402
[45] Jan. 17, 1984

[54] METHOD FOR RAPIDLY PRODUCING CHOCOLATE FORMS

[76] Inventor: Güenther Kaupert, Erndtebrueck, Fed. Rep. of Germany

[21] Appl. No.: 407,057

[22] Filed: Aug. 11, 1982

Related U.S. Application Data

[63] Continuation-in-part of Ser. No. 138,152, Apr. 7, 1980, abandoned.

[51] Int. Cl.³ ............................ A23G 1/21; A23P 1/00
[52] U.S. Cl. .................................. 426/515; 425/547; 426/106; 426/138
[58] Field of Search ............... 426/515, 514, 512, 389, 426/660, 279, 280, 103, 125, 138, 106, 410, 414; 425/547; 264/266

[56] References Cited

U.S. PATENT DOCUMENTS 2,166,568  7/1939  Kuhlke ................................ 426/414
4,014,156  3/1977  Klahn et al. ........................ 426/414

Primary Examiner—Raymond N. Jones
Assistant Examiner—George C. Yeung
Attorney, Agent, or Firm—Klaus J. Bach

[57] ABSTRACT

In a method and apparatus for producing chocolate forms, the molding tools are provided with chocolate retaining and handling elements which are disposed in the molds before the molding process and which define part of the molding cavity. During and after injection of the hot chocolate into the cavity, the molding tool top part is cooled to a temperature much lower than the bottom part, whereby the top part can be rapidly and easily lifted from the bottom part and the retaining and handling element can be removed from the molds with the chocolate forms supported thereon, which forms can then be further cooled outside the molding tool. The molding tool is then available for the next molding step. The retaining and handling element may remain with the chocolate forms and may become part of the packaging, thereby greatly facilitating handling and accelerating production of delicate chocolate forms.

4 Claims, 3 Drawing Figures

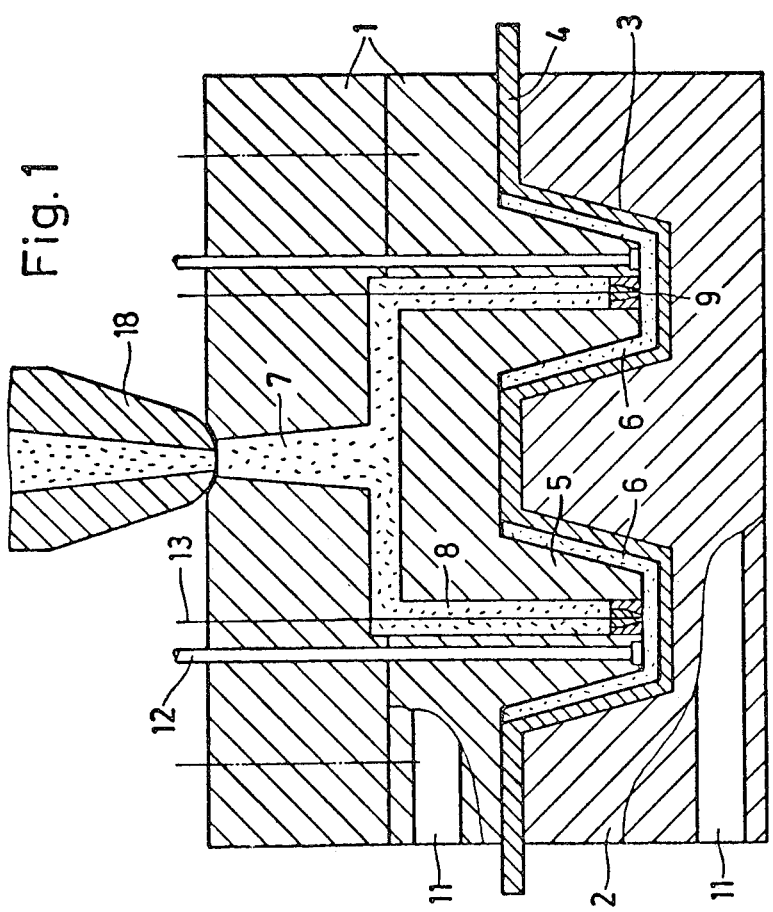
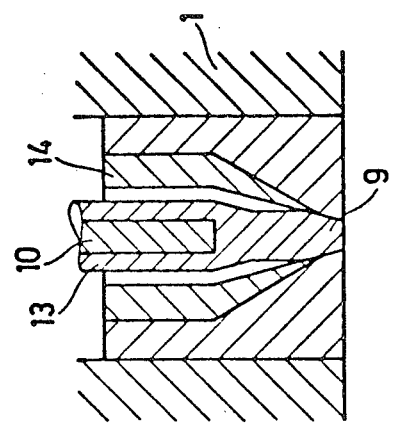

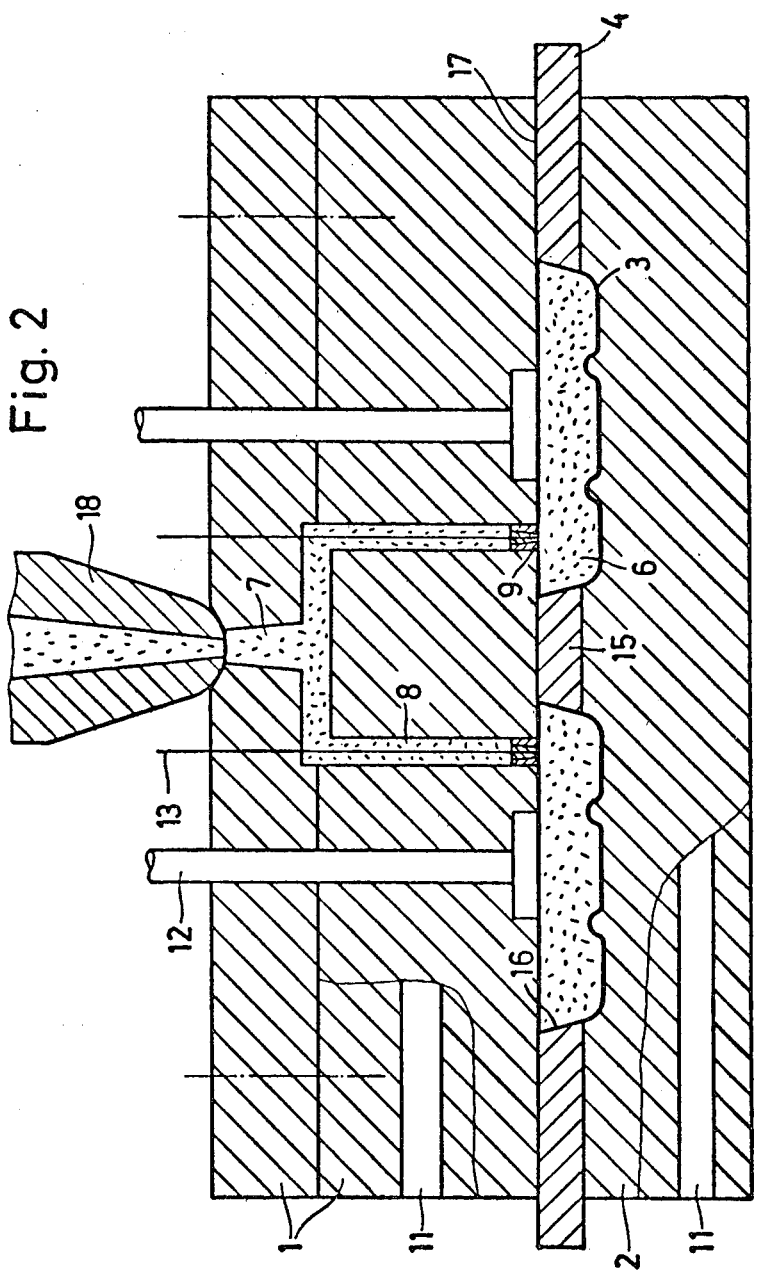

METHOD FOR RAPIDLY PRODUCING CHOCOLATE FORMS

This is a continuation-in-part application of application Ser. No. 138,152 of Apr. 7, 1980, now abandoned.

BACKGROUND OF THE INVENTION

1. Field of the Invention:

The invention relates to a method and apparatus for producing chocolate forms in molding tools consisting of several parts which together define a molding cavity corresponding to the chocolate form to be produced, the cavity being closed except for an inlet opening through which heated chocolate is injected under pressure until the cavity is completely filled with chocolate. Solidifying of the chocolate is achieved by cooling of the molding tool.

2. Description of the Prior Art

It is known for example from German Pat. No. 462,968 to provide a molding cavity by combining two shell-shaped mold parts such that they define therebetween a molding cavity with an inlet opening through which chocolate of a pasty consistency is injected under pressure. When the mold is filled, the pressure is maintained for some time in order to improve the density of the chocolate within the mold cavity. The mold is then removed from the injection station and, after a stem is inserted into the inlet opening into the chocolate form within the cavity, the mold is conveyed through a cooling chamber. At the exit end of the cooling chamber the mold is opened and the chocolate form is removed from the mold.

This method, however, has not been successful in practice; first, because the achievable molding rate is relatively low when compared with competing methods since, with the use of shell-type molds, the applicable molding pressure is relatively low for mechanical reasons so that the filling process itself already is relatively time-consuming. Second, since the chocolate form can be removed from the mold only after the mold has been conveyed through a cooling chamber, each mold is needed for a relatively long time in the production of every single chocolate form such that, for mass production, a large number of relatively expensive molds is required.

From U.S. Pat. No. 2,166,568 (Kuhlke) there is known a process for the production of chocolate sweets containing an inner sugar crust which is inserted into a preformed chocolate shell as a sugar solution which solidifies upon cooling. In this process, the preformed chocolate shell only comes in contact with the mold. No molten material contacts the mold such that the finished chocolate sweet can be easily removed from the mold surfaces.

From U.S. Pat. No. 4,014,156 (Klahn) it is known to introduce molten chocolate into a wrapper disposed within a mold. Here, all the mold surfaces are covered by a preformed wrapper material so that, again, the chocolate form can be easily and rapidly removed from the mold.

In many cases, however, it is desirable to present the chocolate forms without covering with delicate shapes and smooth surfaces and it is certainly desirable to manufacture even chocolate forms with delicate shapes rapidly and accurately.

SUMMARY OF THE INVENTION

A method and apparatus for producing chocolate forms in a molding tool provided with a molding cavity employs a chocolate form retaining and handling element which is placed into the molding tool and forms part of the walls of the molding cavity. The top part of the molding tool is cooled to a substantially lower temperature than the bottom part while the molding cavity is filled with chocolate and the top surface of the chocolate form is rapidly solidified, and the mold can be opened and the retaining and handling element can be removed from the bottom part with the delicate chocolate forms disposed thereon. For further cooling, the chocolate forms remain on the retaining and handling element, while the molding tool can be used again. The chocolate forms may remain on the retaining and handling element for packaging as the retaining and handling element may become part of the packaging.

With the process and arrangement according to the invention the molds can be opened again shortly after injection of hot chocolate into the molds is completed since, as a result of the intense cooling of the mold top part, condensate is formed at its surfaces as soon as the hot chocolate is injected and before the chocolate actually contacts the mold cover surface. The condensate layer prevents sticking of the chocolate to the cover surfaces. In addition, the chocolate solidifies rapidly at least in the surface areas where it comes into close contact with highly cooled mold surfaces. Immediate removal of the chocolate forms from the molds is then possible by means of the retaining and handling elements which contain the chocolate forms and provide sufficient support for the—at this state—delicate chocolate forms to avoid deformation or breakage. The retaining and handling elements preferably are containment structures which remain with the chocolate forms serving as packaging supports. Final cooling of the chocolate forms is also speeded up since the chocolate forms, removed from the molds, have their surfaces directly exposed to a cooling gas with the exception of the areas covered by the retaining and handling elements which, however, consist of only thin materials with relatively good heat conductivity.

BRIEF DESCRIPTION OF THE DRAWINGS

FIG. 1 shows, in cross-section, a two part molding tool in a closed position with a chocolate form retaining and handling element in place therein for the production of chocolate cups;

FIG. 2 shows, in cross-section, a molding tool with a grid-type retaining and handling element for the production of solid chocolate forms; and FIG. 3 shows, in cross-section, an injection nozzle disposed within a mold inlet opening.

DESCRIPTION OF THE PREFERRED EMBODIMENTS

A molding tool as shown in FIG. 1 consists essentially of an upper part 1 and a lower part 2. The lower part 2 has cup-shaped cavities 3 formed therein and fittingly receives a retaining and handling element or plate structure 4. The upper part 1 has projections 5 so protruding into the cavities 3 that, upon engagement of the upper and lower mold parts 1 and 2 with the handling plate structure 4 clamped therebetween, there are provided cup-shaped cavities 6 into which hot molten chocolate material is injected. For this purpose, the upper part 1 is provided with injection channels 7, 8 extending through the projections 5 and having at their lower ends adjacent the cavities 6 small nozzles 9 provided with a closure structure (FIG. 3). The nozzles 9 are provided with heating means 10 preferably arranged within a closure pin 13. The nozzles 9 and injection channels 8 are lined with an insulating layer 14 to keep the chocolate therein hot.

The upper and lower parts of the mold are further provided with channels 11 through which a liquid coolant such as ammonia may be conducted. Also, the upper part 1 has rod-type ejectors 12 extending therethrough which ejectors are exially movable and have their lower ends disposed adjacent the cavity 6. All surfaces defining the cavity 6 are preferably coated with a parting compound such as tetrafluoroethylene.

When the retaining and handling plate 4 is placed into the lower mold and the molding tool 12 is closed, molten liquid chocolate is injected into the injection channel 7 under high pressure by means of an injection device (as indicated by injection head 18). From the injection channel 7 the molten liquid chocolate flows into the distribution channels 8 and through the open nozzles 9 into the cavities 6 until the cavities are completely filled. The air displaced in the process escapes through the joints between the upper and lower molds because of surface roughness. During and after the injection step the molding tool is cooled by a coolant conducted through the channels 11. One of the parts, preferably the lower part 2 is maintained at about 20° C. while the other, preferably the upper part 1 is maintained at a substantially lower temperature of 0° C. or less, such as about −5° C. The surface temperature of the upper mold should be below the freezing point. Tests have shown, however, that even much lower temperatures may be used, such as −10° C. Even −20° C. has been found acceptable for still faster molding speeds if the formed chocolate body, which is still quite sensitive, is carefully handled. The appearance of the chocolate bodies did not suffer and no difference was found in the taste of the chocolate bodies. The preferred temperature range for the cooling of the top part of the mold however was −5° C. to −10° C. at the surface of the mold since this range was easy to achieve and provided excellent results with few rejects.

After solidification of the chocolate adjacent the upper part 1, the molding tool 1, 2 is opened, that is, the upper part 1 is lifted while the ejectors 12 remain in position, holding the chocolate form down. After the ejectors are retracted, the retaining and handling plate 4 can be removed together with the chocolate forms retained therein. Before the start of the subsequent injection step the nozzles 9 and, if necessary, all injection channels 7, 8 are heated in order to melt the chocolate solidified therein.

The retaining and handling plate 4 may consist of a stamped metal foil of good stability or of plastic material and may remain with the chocolate forms, serving as packaging material.

FIG. 2 shows an arrangement similar to that of FIG. 1, the arrangement however being used for the production of solid chocolate forms. Elements which have the same functions as corresponding elements of FIG. 1 therefore are identified by the same numerals.

In the embodiment shown in FIG. 2 the retaining and handling element is in the form of a grid whose web portions 15 are held clamped between the upper and lower parts 1 and 2 of the molding tool. The faces 16 of the web portions 15 which surround and define the mold cavities 6 are disposed flush with the walls defining the molding cavities 3 and together with the molding cavity walls provide the space for the chocolate form to be molded. The faces 16 of the webs of the retaining and handling grid are conically inclined with respect to the separation plane between the upper and lower mold parts 1, 2 such that the chocolate forms molded into the molding cavities 6 do not drop out of the retaining and handling grid during their removal from the molding tool and during further handling.

It is noted that, although reference is made in the example given in the specification generally to the top part of the mold to be cooled to a lower temperature than the bottom part, it may, of course, be vice versa, that is, the lower molding part may be cooled to a lower temperature than the bottom part. Also, the retaining element may not be associated with the bottom molding part but with any one of the molding parts. Furthermore, the mold may be arranged at any angular position. It is important however that one of the molding parts is cooled to a lower molding surface temperature than the other.

What is claimed is:

1. A method for rapidly producing well-defined chocolate forms in a molding tool consisting of at least lower and upper parts which together define a molding cavity having limited minor surface areas and major surface areas corresponding to a well-defined shape of a chocolate form to be molded therein and further having an inlet opening through which heated chocolte is injected under pressure into said molding cavity until the cavity is completely filled, said method comprising the steps of: inserting into the molding tool before it is closed a retaining and handling element which fits between the upper and lower parts of the molding tool and defines said limited minor areas to be contacted by the chocolate in the cavity; injecting molten chocolate under pressure into said molding cavity and into contact with said major mold surface areas and with the minor surface area formed by said retaining and handling element; cooling the upper molding part having said major surface areas to about −5° C. and the lower mold part receiving said retaining and handling element to about 20° C. during and after the injection step; lifting the upper part of the molding tool while holding the chocolate form in the lower part of the molding tool and lifting and removing from the lower part of the molding tool the retaining and handling element with the chocolate form supported thereon; and further cooling the chocolate form while supported on the retaining and handling element.

2. A method as claimed in claim 1, wherein the upper part of the molding tool is cooled down to −5° C. to −10° C.

3. A method for rapidly producing well-defined chocolate forms in a molding tool consisting of at least two separable parts which together define a molding cavity corresponding to a well-defined shape of a chocolate form to be molded therein and having an inlet opening, said method comprising the steps of: placing into the molding parts a retaining and handling element which fits between the separable parts and defines a portion of said cavity, injecting molten chocolate under pressure through said inlet opening into said cavity and into contact with the mold surfaces defining said cavity while cooling one of the molding parts down to a temperature of less than 0° C. so as to generate a condensate film on the surface of said one molding part and rapidly cool the chocolate in contact therewith, and maintaining the other molding part at about 20° C. and thereafter removing said one molding part and then said retaining and handling element with said chocolate form thereon, from said other molding part.

4. A method as claimed in claim 3, wherein said one molding part is cooled down to a surface temperature of −5° C. to −10° C.

* * * * *